J. C. SCHLEICHER.
TREAD FOR PNEUMATIC TIRES.
APPLICATION FILED FEB. 28, 1910.

974,602.

Patented Nov. 1, 1910.

Witnesses
R. E. Fischer

Inventor
John C. Schleicher
By Blackwood Bros
Attorneys.

UNITED STATES PATENT OFFICE.

JOHN C. SCHLEICHER, OF MOUNT VERNON, NEW YORK.

TREAD FOR PNEUMATIC TIRES.

974,602.  Specification of Letters Patent.  Patented Nov. 1, 1910.

Substituted for application filed March 26, 1909, Serial No. 486,024. This application filed February 28, 1910. Serial No. 546,475.

*To all whom it may concern:*

Be it known that I, JOHN C. SCHLEICHER, a citizen of the United States, residing at Mount Vernon, in the county of Westchester and State of New York, have invented certain new and useful Improvements in Treads for Pneumatic Tires, of which the following is a specification.

My invention relates to improvements in treads for pneumatic tires.

Great difficulty has heretofore been experienced in providing a removable flexible protective tread for pneumatic tires, for the reason that if not secured permanently to the tire it would creep and if the tire should become slightly flat or deflated, would come off and if permanently secured thereto would injure the tire and destroy its flexibility.

This invention therefore has for its object to provide a yieldable protective tread for pneumatic tires adapted to be easily and readily placed thereon or removed therefrom and when in place adapted to be retained against creeping and not destroy the flexibility of the tire.

It has for a further object to provide a tread of this character which is simple and inexpensive in construction and adapted to prevent skidding of the wheels and injury and puncture of the tires.

Figure 1:
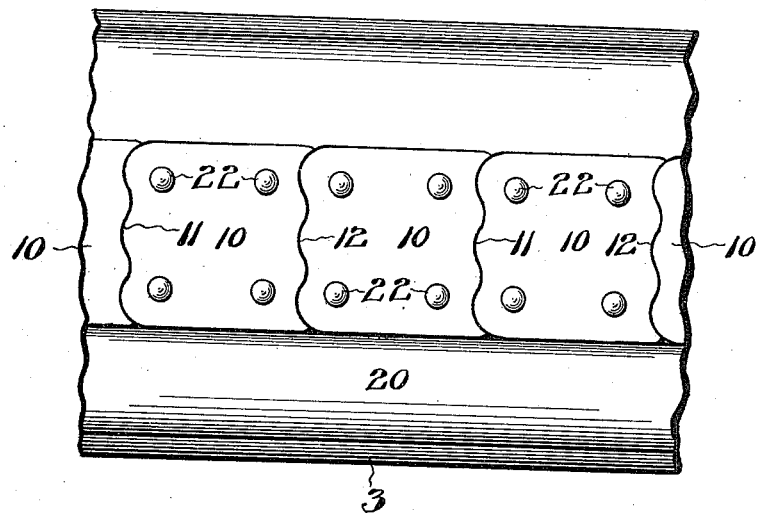
Figure 2:
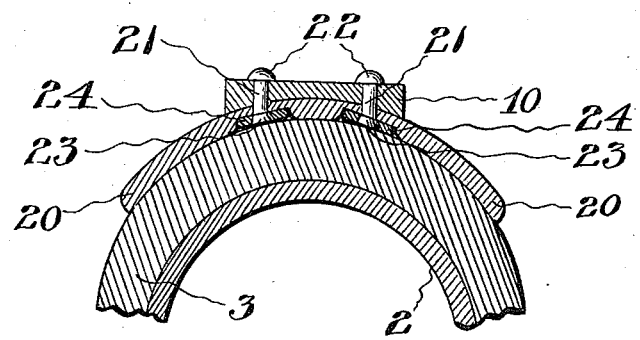

In the drawings: Figure 1 is a fragmentary plan view of a pneumatic tire having my removable flexible protective tread thereon. Fig. 2, a transverse fragmentary sectional view.

In all the figures of the drawings illustrating my invention, like reference characters designate corresponding parts.

Referring to the drawings, I have shown, for the purpose of illustrating the application of my invention, one of the many forms of pneumatic tires embodying as usual an inner tube 2 and an outer shoe or covering 3, although it will be understood that my invention is designed and adapted to be applied to any of the other forms of pneumatic tires.

My flexible protective tread comprises a number of metal plates 10 having straight side edges and scalloped front and rear edges 11 and 12, the scallops of the front edges of the plates being complementary to those in the rear edges thereof so as to adapt said plates, when brought together, to interlock.

The plates are secured in interlocked position upon a flexible elastic strip 20 which encircles the shoe of the pneumatic tire, the means for securing said plates comprising rivets 21 which pass through the plates and strip the rounded outer heads 22 projecting beyond the faces of the plates and serving as means for preventing the wheel from slipping or skidding and the inner heads 23 having washers 24 thereon which are preferably sunk into the strip 20 so as to come flush with the inner surface thereof and prevent injury to the shoe 3.

The interlocking of the plates 10 by means of the engagement of their scalloped front and rear edges, permits of lateral and inward and outward movement of the plates with the strip to which they are secured, but prevents lateral movement thereon.

It will be understood that by this construction of the plates the protector may be stretched circumferentially to allow of its being placed on and removed, and that the plates may move outwardly without disturbing the alinement of their side edges.

I do not wish to be understood as limiting myself to the precise details and arrangements of parts shown and described, but reserve the right to all modifications within the scope of my invention.

Having now described my invention what I claim as new and desire to secure by Letters Patent, is:

1. A tread for pneumatic tires embodying a removable flexible strip adapted to be stretched onto a tire, and a number of circularly arranged contacting metallic plates secured on said strip, each having its entire front and rear edges scalloped and the adjacent scalloped edges of the plates interlocking to allow of lateral and outward and inward movement of said plates with the strip, but prevent lateral movement of the plates on the strip, substantially as described.

2. A tread for pneumatic tires embodying a removable flexible strip adapted to be stretched onto a tire, a number of circularly arranged contacting metallic plates on said strip, each having its entire front and rear edges scalloped and the adjacent edges of the plates interlocking to allow of lateral and outward and inward movement of the plates with the strip, but prevent lateral independent movement of the plates on the strip and means for securing said plates to said strip, substantially as described.

3. A tread for pneumatic tires embodying a removable flexible strip adapted to be stretched onto a tire, a number of circularly arranged contacting metallic plates on said strip, each having its entire front and rear edges scalloped and the adjacent edges of the plates interlocking to allow of lateral and outward and inward bending movement of the plates with the strip, but prevent lateral movement of the plates on the strip and means for securing said plates on said strip comprising rivets each having an outer and an inner head, the outer heads extending beyond said plates and washers on the inner heads, substantially as described.

In testimony whereof I have signed my name in the presence of two subscribing witnesses.

JOHN C. SCHLEICHER.

Witnesses:
  KATHARINE M. AHRENS,
  CHARLOTTE E. ELLIOTT.